(12) United States Patent
Lefkowicz

(10) Patent No.: US 10,441,485 B2
(45) Date of Patent: Oct. 15, 2019

(54) WHEELCHAIR WITH A TILTING MECHANISM

(71) Applicant: Mobility Builders, Seattle, WA (US)

(72) Inventor: Anthony Todd Lefkowicz, Seattle, WA (US)

(73) Assignee: Mobility Builders, Seattle, WA (US)

( * ) Notice: Subject to any disclaimer, the term of this patent is extended or adjusted under 35 U.S.C. 154(b) by 81 days.

(21) Appl. No.: 15/721,130

(22) Filed: Sep. 29, 2017

(65) Prior Publication Data

US 2019/0099307 A1 Apr. 4, 2019

(51) Int. Cl.
*A61G 5/10* (2006.01)
*G05B 19/05* (2006.01)

(52) U.S. Cl.
CPC ............ *A61G 5/104* (2013.01); *G05B 19/05* (2013.01); *A61G 5/1054* (2016.11); *G05B 2219/15052* (2013.01)

(58) Field of Classification Search
CPC .... A61G 5/104; A61G 5/1054; A61G 5/1075; A61G 5/1089
See application file for complete search history.

(56) References Cited

U.S. PATENT DOCUMENTS

| | | | | |
|---|---|---|---|---|
| 4,591,182 A | * | 5/1986 | Wood | A61G 5/00 280/250.1 |
| 6,047,979 A | * | 4/2000 | Kraft | A61G 5/10 280/250.1 |
| 6,454,285 B1 | * | 9/2002 | Koenig | A61G 5/14 188/2 F |
| 7,264,272 B2 | * | 9/2007 | Mulhern | A61G 5/043 180/65.1 |
| 7,316,282 B2 | * | 1/2008 | Mulhern | A61G 5/043 180/65.1 |
| 9,693,914 B2 | * | 7/2017 | Ooyama | A61G 5/1021 |
| 2005/0206124 A1 | * | 9/2005 | Levi | A61G 5/043 280/304.1 |

* cited by examiner

*Primary Examiner* — Faye M Fleming
(74) *Attorney, Agent, or Firm* — Perkins Coie LLP

(57) ABSTRACT

A wheelchair including: a frame including a backrest portion; and a drive wheel attached to the frame using an axle, wherein the axle is attached below the backrest portion and is configured to have the drive wheel rotate about the axle; a front caster connected to the frame and horizontally offset from the drive wheel; and a relative positioning mechanism connected to the frame and the front caster assembly, wherein the relative positioning mechanism is configured to locate the front caster assembly at two or more positions relative to the frame along a vertical direction.

20 Claims, 6 Drawing Sheets

WHEELCHAIR WITH A TILTING MECHANISM

TECHNICAL FIELD

The disclosed embodiments relate to wheelchairs, and, in particular, to wheelchairs with a tilting mechanism.

BACKGROUND

People often use wheelchairs (e.g., a structure including a seat attached to a set of wheels) for mobility in place of walking. Through growth in technology, formats and features for wheelchairs also have increased to meet various needs of their users. Such formats and features can include seating adaptions, individualized controls, and application-specific configurations (such as for sport wheelchairs or beach wheelchairs).

In some instances, wheelchairs can allow the user to change the seating configuration and recline (e.g., by tilting or repositioning a backrest of the wheelchair). For certain users (e.g., users without postural control or stability to maintain a neutral posture in a wheelchair for a prolonged period of time and/or lack core strength to maintain proper posture), the reclining feature can provide a level of comfort and usability crucial to their daily lives. A wheelchair user in a more upright position may be able to develop more trunk control, may have a more functional field of view, may eat and swallow more safely, may be better able to interact with other people and his/her surroundings, and may be more alert. A wheelchair user in a tilted (e.g., by changing an angle of a seat and a back rest and/or other structures as one unit) or reclined (e.g., by adjusting the back rest to change the angle between the seat and the back rest without moving the seat) position may be able to rest, may be able to maintain a neutral posture for longer, may be more comfortable for a longer period of time, and may relieve skin pressure.

While beneficial, implementing a tilting or reclining feature often involves additional frames and other complexities that increase the manufacturing cost, increase the weight, create added maintenance & reliability concerns, and/or decrease the usability (e.g., inability to fold the wheelchair for transport or storage) of the wheelchair. In some instances, the increased cost, the increased weight and/or the decrease in usability can prohibit ownership or practical use of adjustable wheelchairs.

Thus, there is a need for wheelchairs with a simple, robust, tilting mechanism that is easy to manufacture, maintain and withstand the rigors of functional use throughout a typically wheelchair lifecycle. In view of the ever-increasing commercial competitive pressures, along with growing consumer expectations and the desire to differentiate products in the marketplace, it is increasingly desirable to develop a design that resolves these problems.

DETAILED DESCRIPTION

Figure 1:
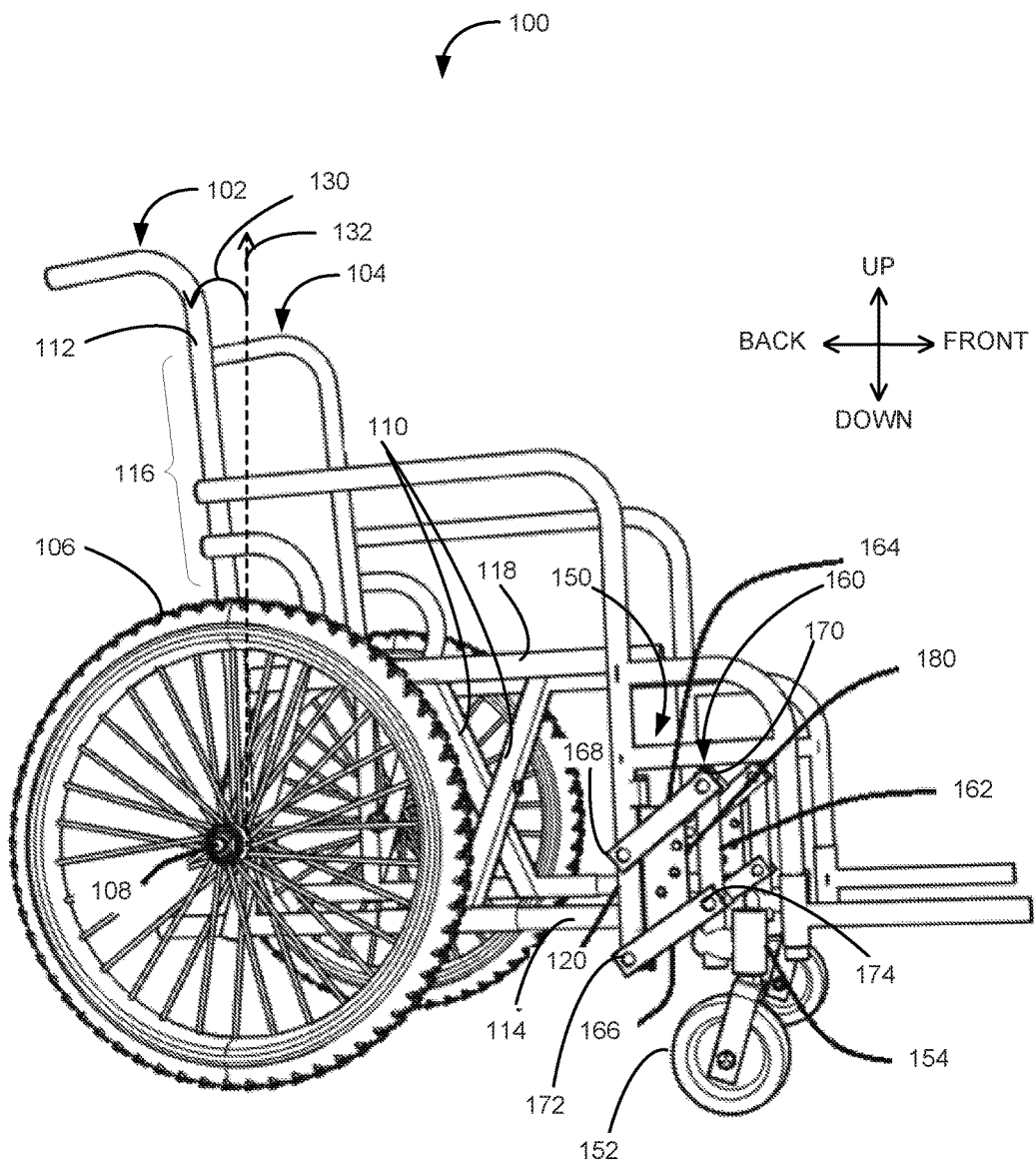
FIG. 1 is a perspective view of a variable tilt wheelchair in accordance with an embodiment of the present technology.

The technology disclosed herein relates to a variable tilt wheelchair (e.g., manual wheel chairs). The variable tilt wheelchair can include: a pair of vertical frames that are each attached to a drive wheel through an axle, a seat extending along a horizontal direction between the pair of vertical frames for providing a horizontal planar surface for seating a user, and a backrest extending between the pair of "vertical" frames and located above the seat for providing a vertical planar surface contacting upper body of the user.

The variable tilt wheelchair can further include a set of tilt assemblies configured to change an orientation of a seating system (e.g., the seat, the back rest, and associated frame portions) relative to a vertical direction or axis, thereby allowing the user to tilt back or tilt forward to upright while sitting in the wheelchair. Each of the tilt assemblies can be attached to a lower portion, a front portion, or a combination thereof of one of the frames.

In some embodiments, the tilt assemblies can each include components that are configured to change a position or a location of a caster wheel relative to the frame (e.g., increasing or decreasing a distance between the caster wheel and the frame) along a vertical direction (e.g., by rotating the frame about the drive wheel axle and moving the front and/or bottom portion of the frame away from the caster wheel). For example, each tilt assembly can include a floating link attached to the caster assembly (e.g., where the floating link is directly attached to or integrally including a caster stem housing that constrains the caster stem and, indirectly, the caster wheel) and one or more grounded links (e.g., a bar or a beam structure having a length greater than other dimensions) connecting the frame and the floating link. The grounded links can form a rotating joint (e.g., ball and socket joint or a pin/hinge joint) with the frame, thereby allowing an angle (e.g., as formed at the joint by the frame and the corresponding grounded link) to be adjustable. In some embodiments, the grounded links can similarly form an additional rotating joint with the floating link and allow the caster stem housing to maintain an orientation relative to the horizontal plane.

In some embodiments, the variable tilt wheelchair can further include one or more locking mechanisms to secure the frame and seating system at one of multiple possible positions (e.g., by maintaining the relative positions of caster stem housing and the main drive wheel). For example, each of the locking mechanisms can include a locking pin and a locking plate having holes therein configured to complement the locking pin to fix the angle between the frame and the grounded links. In some embodiments, the locking pin can be a portion or protrusion of a corresponding grounded link that extends along a direction perpendicular to the length of the corresponding link. Accordingly, the locking plate can be attached to the frame through a hinge joint, and rotate about the attachment to engage or disengage the locking pin. In alternative embodiments, the locking pin can be a separate pin that is configured to insert into or through one of the holes in the locking plate and one of the grounded links.

Figure 2:
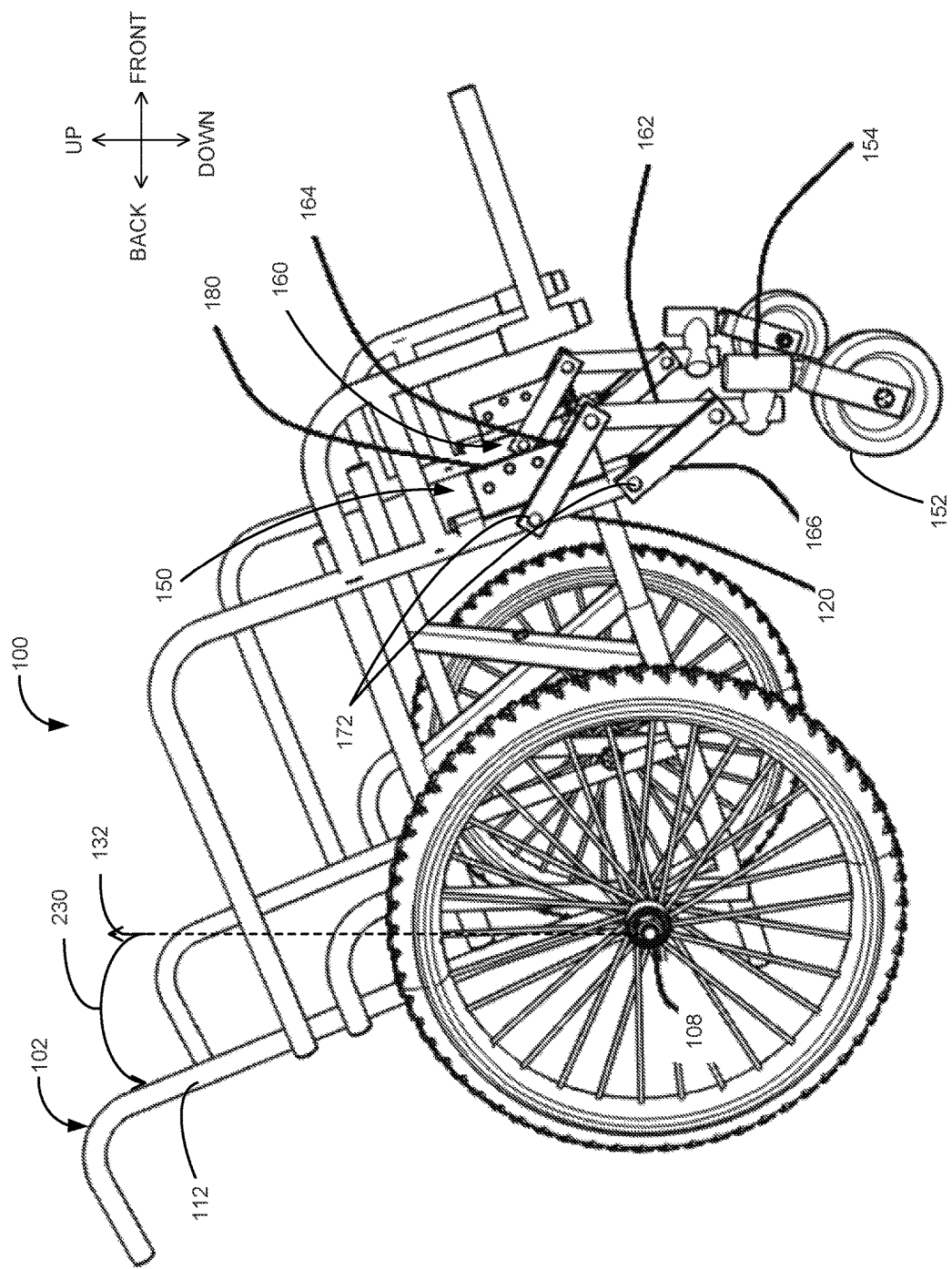
FIG. 2 is another perspective view of the variable tilt wheelchair in accordance with an embodiment of the present technology.

As illustrated in FIGS. 1-2, the term "up," "down," "front," and "back" (i.e., correspondingly for terms "vertical" and "horizontal") referred to herein are used to describe directions or locations relative to the user's designated orientation while seated in the variable tilt wheelchair. Accordingly, vertical directions or planes coincide with the gravitational vector, and horizontal directions or planes are orthogonal to the vertical planes or directions. Further, the terms "top," "bottom," "above," and "below" are used with respect to the vertical direction or plane. The terms "side," "rear," and "behind," are used with respect to the horizontal direction or plane and relative to the designated orientation of the user's torso and/or face when sitting in the variable tilt wheelchair. Further, the terms "distal" and "proximal" are used with respect to distance from the torso of the user.

FIG. 1 is a perspective view of a variable tilt wheelchair 100 in accordance with an embodiment of the present technology. The variable tilt wheelchair 100 can include a pair of side frames including a first frame 102 and a second frame 104 (e.g., structures that each provide an outline/shape and structural support for the variable tilt wheelchair 100) that mirror each other, a drive wheel 106 connected through a wheel axle 108 to each of the first frame 102 and the second frame 104, and a cross brace structure 110 (e.g. a foldable or a collapsible assembly configured to adjust a distance between end points thereof) directly attached to both the first frame 102 and the second frame 104.

The first frame 102 and the second frame 104 can each include a back post 112, a bottom-horizontal portion 114, or a combination thereof that is attached to the drive wheel 106. For example, the rear-vertical portion 112, the bottom-horizontal portion 114, or a combination thereof of the frame can include a bushing for the wheel axle 108, where the bushing, the wheel axle 108, or a combination thereof are configured to have the drive wheel 106 rotate about the wheel axle 108.

Each of the side frames can further include a back post 116 (e.g., a section of the rear-vertical portion 112) above the drive wheel 106 and/or the wheel axle 108, and a seat rail 118 (e.g., a structural component attached to or integral with the rear-vertical portion 112 that extends away from the rear-vertical portion 112) between the back post 116 and the drive wheel 106 and/or the wheel axle 108. A back rest (not shown) can be attached to the back post 116 of the first frame 102 and extend in a horizontal direction, and be further attached to a corresponding portion on the second frame 104. A seat (not shown) can be attached to the seat rail 118 of the first frame 102 and extend in a horizontal direction, and further be attached to a corresponding portion on the second frame 104.

In some embodiments, the brace structure 110 can be configured to fold the reclinable wheelchair 100. For example, the brace structure 110 can include a cross-brace attaching the first frame 102 to the second frame 104. The cross-brace can include a first member connected to a seat support portion of the first frame 102, extending down and away, and connected to a bottom-horizontal portion of the second frame 104. The cross-brace can further include a second member connected to a bottom-horizontal portion of the first frame 102, extending up and away, and connected to the seat support portion of the second frame 104, thereby mirroring the first member. The first member and the second member can be further directly connected using a pin-type joint. For folding the variable tilt wheelchair 100, the first member and the second member can rotate about connection points on the frame, and the first member and/or the second member can rotate about a pin at the pin-type joint in decreasing a separation distance between the side frames.

The variable tilt wheelchair 100 can further include a tilt assembly 150 attached to each of the side frames, where the tilt assembly 150 is configured to change an orientation of the wheelchair frame relative to a vertical reference direction 130 (e.g., a direction pointing upward from the wheel axle 108). As illustrated in FIG. 1, the variable tilt wheelchair 100 can orient the back post 116 at a first position (e.g., for an upright seating position for the user) with the tilt assembly 150 and form a first tilt angle 132 between the back post 116 and the vertical reference direction 130. The tilt assembly 150 can be configured to change the orientation of the back post 116 to form a different tilt angle greater than the first tilt angle 132, thereby allowing the user to sit with increased tilt.

The variable tilt wheelchair 100 can include the tilt assembly 150 attached at a front portion, a bottom portion, or a combination thereof of the corresponding frame. For example, the tilt assembly 150 can be attached to the bottom-horizontal portion 114, a front vertical portion 120 (e.g., a structural component integral with or connected to a front portion of the bottom-horizontal portion 114 and/or a front portion of the seat rail 118 that extends in a vertical direction), or a combination thereof.

The tilt assembly 150 can include a caster wheel 152 attached to a caster stem housing 154 through the caster stem. The tilt assembly 150 can further include a relative positioning mechanism 160 (e.g., a set of structures for adjusting a position of the caster wheel 152 relative to the corresponding frame or a portion thereof), a locking mechanism 180 (e.g., a set of structures for fastening or fixing the relative positioning mechanism 160 to maintain the corresponding position), or a combination thereof for providing a variable tilt feature.

As illustrated in FIG. 1, the relative positioning mechanism 160 can include a double rocker-four bar configuration to approximate a rotation of the caster stem housing 154 around the wheel axle 108. The four bar mechanism can be designed so that, in at least two positions, the caster stem housing 154 is perpendicular to the ground. The relative positioning mechanism 160 including the double rocker-four bar configuration allows the variable tilt wheelchair 100 to track straight based on the perpendicular arrangement of the caster stem housing 154 relative to the ground.

For example, the relative positioning mechanism 160 can include a floating link 162, a first grounded link 164, a second grounded link 166, or a combination thereof connected to the front vertical portion 120 of the corresponding frame. The floating link 162 can include a structure (e.g., a bar or a rod) directly and rigidly connected to or integral with the caster stem housing 154, and can extend away from the front caster wheel 152 (e.g., upward along a vertical direction). The floating link 162 can be directly connected to both the first grounded link 164 and the second grounded link 166.

The first grounded link 164 and the second grounded link 166 can each include a structure (e.g., a set of one or more bars or rods) that extend between and connect the corresponding frame (e.g., lower section of the front vertical portion 120 of either the first frame 102 or the second frame 104) and the floating link 162 with the front caster wheel 152. A first end portion 168 (e.g., a proximal periphery portion) of each link can be directly attached (e.g., by directly contacting the corresponding mechanism or by having both structures directly contacting a common attachment structure) to the corresponding frame, and a second end portion 170 (e.g., a distal periphery portion), which can be opposite the first end portion 168 along a dimension (e.g., a length) of the corresponding grounded link, can be directly attached to the floating link 162. On both the corresponding frame and the floating link 162, the first grounded link 164 can be attached above or closer to the seat rail 118 than the second grounded link 166.

One or more of the attachments between the grounded links (e.g., first grounded link 164 and the second grounded link 166) and the other members (e.g., the corresponding frame and the floating link 162) can form a rotating joint (e.g., a ball-socket joint or a pin joint) that allow the connected structures to rotate along at least one axis. Based on the rotating joint(s), the grounded links can rotate about the connecting pin and along a plane parallel or coincidental with a plane associated with the corresponding frame, a rotational plane of the drive wheel 106, or a combination thereof. With the rotating joint, the grounded links can allow the front caster wheel 152 to approximately rotate around the wheel axle 108.

For example, each attachment between the grounded links (e.g., at or near the first end portion 168) and the corresponding frame can form a first pin joint 172 (e.g., where a separate pin or an integral protrusion from one of the connected structures are inserted into a hole or a depression in one or more of the connected structures). Also for example, each attachment between the grounded links (e.g., at or near the second end portion 170) and the floating link 162 can form a second pin joint 174 (e.g., having a similar connection or structural mechanism as the first pin joint 172).

The locking mechanism 180 can include a structure configured to secure the front caster stem housing 154 at a position and/or an orientation when the mechanism is engaged. For example, the locking mechanism 180 can include a pin (e.g., a protrusion from one or more of the grounded link or a separate pin) and receptacle (e.g., holes or depressions on a plate that is attached to the corresponding frame and/or holes or depressions in one or more of the grounded links) configuration, a disc and compressor configuration, etc.

In some embodiments, the relative positioning mechanism 160 can include multiple sets of fixed positioning links that are rigidly attached to the corresponding frame and extending away at various angles (e.g., in place of the rotating grounded links). Each set of one or more grounded links can correspond to a unique tilt or a user seating position. The floating link 162 can engage and connect to one set of the fixed links to achieve a particular tilt or position. The locking mechanism 180 can secure the floating link 162 to the one set of fixed links during usage, and further allow the floating link 162 to disengage or disconnect for changing the degree of tilt.

In some embodiments, the relative positioning mechanism 160 can include one grounded link that is attached with rotating joints to the floating link 162 and the corresponding frame. When engaged, the locking mechanism 180 can be configured to fix or immobilize each of the rotating joints to secure the position of the front caster wheel 152 relative to the corresponding frame and the wheel axle 108.

In some embodiments, the relative positioning mechanism 160 can be separate from the front caster wheel 152 and connect to the bottom-horizontal portion 114 (e.g., a vertical protrusion thereof instead of the floating link 162) and the front vertical portion 120. The front caster wheel 152 and/or the caster stem housing 154 can remain rigidly attached to the bottom-horizontal portion 114. Further, the rear-vertical portion 112 and the bottom-horizontal portion 114 can be attached using a pin-joint instead of a rigid attachment. For adjusting the tilt angle and changing the seating position, the relative positioning mechanism 160 can allow changes in a distance between a bottom periphery portion of the front vertical portion 120 and a corresponding portion of the bottom-horizontal portion 114. The change in distance can change the angle at the pin joint between the rear-vertical portion 112 and the bottom-horizontal portion 114, thereby changing the tilt angle of the backrest portion 116.

FIG. 2 is another perspective view of the variable tilt wheelchair 100 in accordance with an embodiment of the present technology. As illustrated in FIG. 2, the variable tilt wheelchair 100 can use the relative positioning mechanism 160 to change the tilt angle (e.g., in comparison to FIG. 1) and orient the frame with the back post 116 at a second position (e.g., for a reclined position for the user). At the second position, the back post 116 and the vertical reference direction 130 can form a second tilt angle 230 that is greater than the first tilt angle 132 of FIG. 1.

For example, in transitioning from the first position (e.g., a relatively more upright position) to the second position (e.g., a relatively more tilted position), the first grounded link 164, the second grounded link 166, or a combination thereof can rotate about the first pin joint 172 corresponding thereto and allow the corresponding second end portion 170 to move down (e.g., away from the seat support portion 118 along a vertical direction) relative to the corresponding frame (e.g., the first frame 102 or the second frame 104). Accordingly, the front caster wheel 152, the caster stem housing 154, or a combination thereof can also approximate a rotation about the wheel axle 108 and move in a downward direction. The entirety of the corresponding frame can correspondingly rotate about the wheel axle 108 along a direction counter to the movement of the caster wheel 152, thereby forming the second tilt angle 230.

The locking mechanism 180 can be configured to secure the relative positioning mechanism 160 at the location and/or orientation corresponding to the second tilt angle 230. For example, the locking mechanism 180 can include a plate with a first receptacle at a first location thereon that corresponds to the first tilt angle 132 and a second receptacle at a second location (e.g., below the first location) that corresponds to the second tilt angle 230. For securing the position, the locking mechanism 180 can engage a locking pin with the corresponding receptacle to provide the structural support.

The configuration of joints and links (e.g., individual lengths and/or width of the first grounded link 164, the second grounded link 166, and/or the floating link 162, locations of first pin joint 172, the second pin joint 174 of FIG. 1, or a combination thereof) of the four bar mechanism can be designed for each wheelchair and user. Further, the configuration of joints and links can be designed to align the caster stem housing 154 and/or the stem of the front caster wheel 152) perpendicular to the ground for multiple positions and tilt angles. Also, the configuration of joints and links can be designed so that the movement of the floating link 162 would have a center-of-rotation coincidental to the wheel axle 108 for the upper and lower tilted positions.

Figure 3:
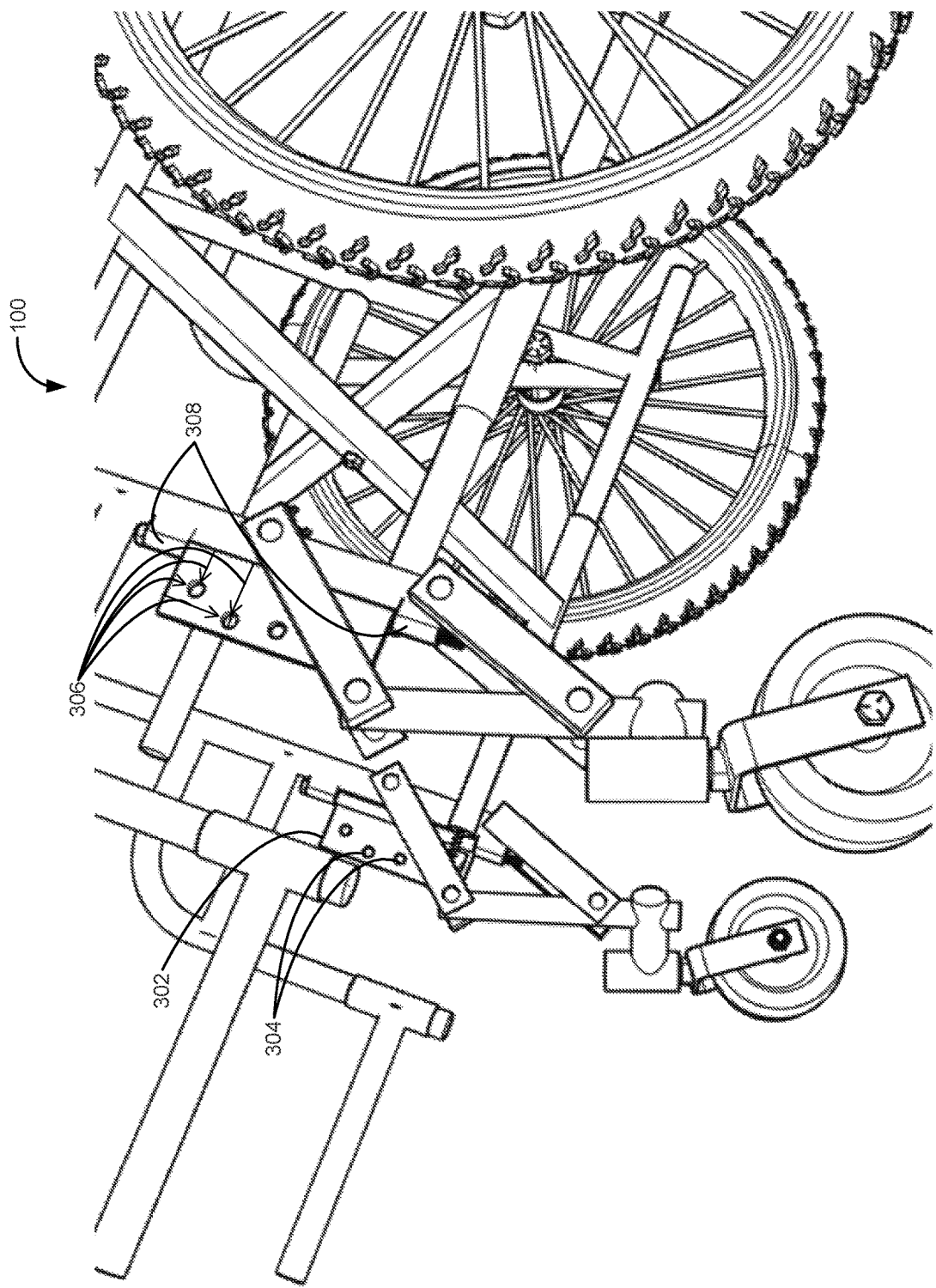
FIG. 3 is an enlarged partial perspective view of the variable tilt wheelchair in accordance with an embodiment of the present technology.

FIG. 3 is an enlarged partial perspective view of the variable tilt wheelchair 100 in accordance with an embodiment of the present technology. As shown in FIG. 3, the variable tilt wheelchair 100 can be configured for the second or reclined position, with the front caster wheel 152 of FIG. 1 further away, in comparison to the first or a more upright position, from the corresponding frame (e.g., the first frame 102 of FIG. 1 or the second frame 104 of FIG. 1) along a vertical direction.

As discussed above, the relative positioning mechanism 160 of FIG. 1 can allow for the adjustment in the relative position of the front caster wheel 152 and the corresponding frame. When engaged, the locking mechanism 180 of FIG. 1 can affix or secure the relative position, and allow the user to sit in and operate the variable tilt wheelchair 100 in the second or tilted position.

In some embodiments, the relative positioning mechanism 160 can include a locking plate 302 including locking holes 304 located therein according to locking positions 306. The locking plate 302 can include a structure configured to connect to the relative positioning mechanism 160 (e.g., one or more of the grounded links therein) and a portion of the corresponding frame and affix the relative positioning between the connected members.

As in the example embodiment illustrated in FIG. 3, the locking plate 302 can include a planar structure with a rectangular shape or outline. The locking plate 302 can be attached to the corresponding frame (e.g., at a lower section of the front vertical portion 120 of FIG. 1). The locking plate 302 can include locking holes 304 (e.g., voids or depressions on or through one or more of the rectangular surfaces on the plate) that are configured to engage with one or more locking pins (not shown) connected to the first grounded link 164 of FIG. 1, the second grounded link 166 of FIG. 1, or a combination thereof to secure the relative position and any corresponding angles between one or more of the grounded links, the corresponding frame (e.g., the front vertical portion 120), the floating link 162 of FIG. 1, or a combination thereof. The locking holes 304 can be arranged or located on the locking plate 302 according to the locking positions 306 (e.g., a coordinate or locational descriptions for the locking holes 304 relative to a reference portion or location on the locking plate 302). The locking positions 306 can include vertical offsets (e.g., within the locking plate 302) that corresponds to different separation distances (e.g., along a vertical direction) between the corresponding frame and the front caster wheel 152. The locking positions 306 can further include horizontal offsets to account for a rotating motion of the grounded links about the first pin joint 172 of FIG. 1.

In some embodiments, the locking plate 302 can be attached to the corresponding frame using a plate hinge 308, such that the locking plate 302 is configured to rotate about the plate hinge 308 and the corresponding frame for engaging and disengaging the locking pin integral with one or more of the grounded links. For example, the locking pin can be integral with the first grounded link 164 can extend horizontally along a right-left direction. The locking plate 302 and the plate hinge 308 can be configured to rotate the locking plate 302 around an axis perpendicular to the direction of protrusion and/or parallel to the front vertical portion 120, allowing the locking pin to engage and disengage from one of the locking holes 304. The locking positions 306 can correspond to the locations of the locking pin corresponding to the movement or relative location of the first grounded link 164 about the first pin joint 172.

Figure 4:
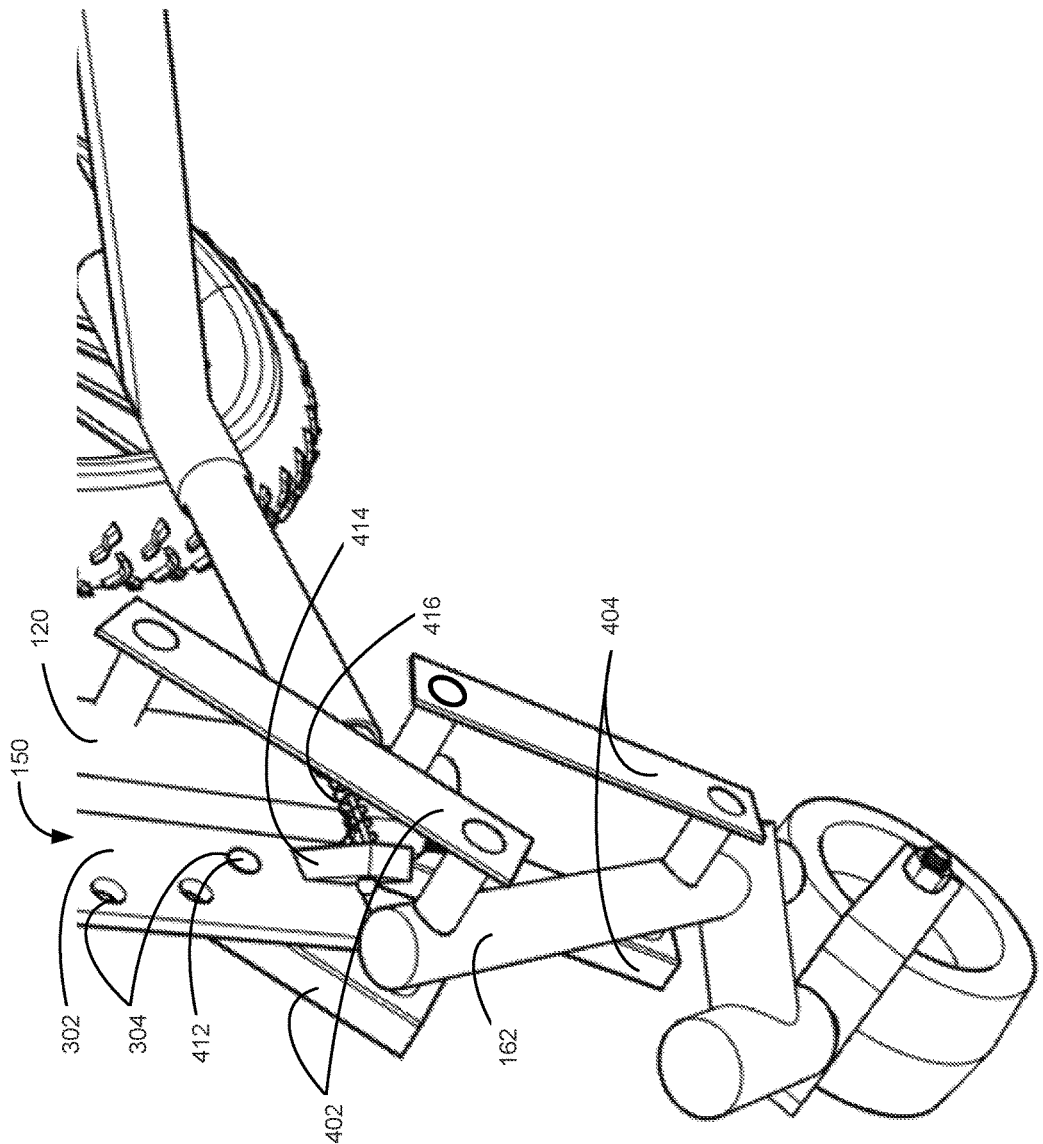
FIG. 4 is a detailed view of an example tilt assembly of the variable tilt wheelchair in accordance with an embodiment of the present technology.

FIG. 4 is a detailed view of an example of the tilt assembly 150 of the variable tilt wheelchair in accordance with an embodiment of the present technology. In some embodiments, the tilt assembly 150 can include the relative positioning mechanism 160 of FIG. 1 corresponding to a double-rocker four-bar configuration. The configuration can include the front vertical portion 120 of the frame attached/corresponding to the tilt assembly 150, the floating link 162, the first grounded link 164 of FIG. 1, and the second grounded link 166 of FIG. 1 for the four bars.

In some embodiments, the first grounded link 164 and the second grounded link 166 can each include a pair of bars that are parallel to each other and attached to opposing sides of the front vertical portion 120 and the floating link 162. For the example embodiment illustrated in FIG. 4, the first grounded link 164 can include a first pair of members 402 and the second grounded link 166 can include a second pair of members 404. Each member for the first pair of members 402 and the second pair of members 404 can include a proximal end portion (e.g., corresponding to the first end portion 168 of FIG. 1 of the grounded links) that are connected to the front lower portion (e.g., to horizontal protrusions extending from opposing location thereof along a left-right direction). Each member for the first pair of members 402 and the second pair of members 404 can include a distal end portion (e.g., corresponding to the second end portion 170 of FIG. 1 of the grounded link) that are connected to the floating link 162 (e.g., to horizontal protrusions extending from opposing location thereof along a left-right direction). Also, each connection between the member and the connected bar can form a pin joint (e.g., corresponding to the first pin joint 172 or the second pin joint 174 of FIG. 1, with the horizontal protrusions configured as the center of rotation for the members).

In some embodiments, the locking mechanism 180 of FIG. 1 can include a locking pin 412 (e.g., a structure configured to insert and lock into one of the locking holes 304 to maintain a physical position or orientation of the relative positioning mechanism 160 for a seating position), a rotational lever 414 (e.g., a structure configured to transfer force to the locking plate 302 for rotation thereof or for stability against rotation), and an engagement mechanism 416 (e.g., a structure configured to transfer force and push/pull the rotational lever 414 for engaging/disengaging the locking plate 302 with/from the locking pin 412). For example, the locking pin 412 can include protrusion extending horizontally along a left-right direction from one or more members of the first grounded link 164 and the second grounded link 166. The locking plate 302 can rotate about the plate hinge 308 of FIG. 3 to engage the locking pin 412 and one of the locking holes 304. The rotation of the locking plate 302 can be manipulated using the rotational lever 414 and/or the engagement mechanism 416 (e.g., a spring-loaded cable). The locking plate 302 can further be secured against rotation (e.g., such as for an engaged setting) using the rotational lever 414 and/or the engagement mechanism 416.

Figure 5:
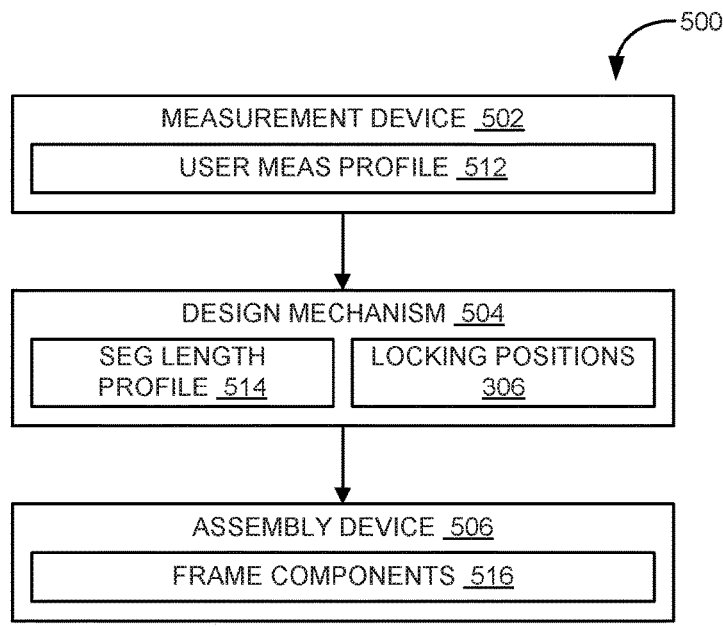
FIG. 5 is a system for manufacturing the variable tilt wheelchair in accordance with an embodiment of the present technology.

FIG. 5 is a system 500 for manufacturing the variable tilt wheelchair 100 of FIG. 1 in accordance with an embodiment of the present technology. The system 500 can include a measurement device 502 (e.g., a device configured to determine user's physiological measurements), a design mechanism 504 (e.g., a device or a system configured to calculate size, shape, relative locations and/or orientations, or a combination thereof for components of the variable tilt wheelchair 100), an assembly device or devices 506 (e.g., a device configured to arrange the components according to the calculation results for assembling the variable tilt wheelchair 100), or a combination thereof.

In some embodiments, the measurement device 502 can include a set of sensors (e.g., laser-based sensors or position sensors on moveable components, such as for a seat or a foot rest assembly) configured to automatically measure physiological aspects of the user (e.g., torso length and/or width corresponding to dimensions of the backrest portion and/or the seat portion, and/or user's leg length corresponding to dimensions of the seat portion and/or position of the footrest) that will utilize the variable tilt wheelchair 100. The measurement device 502 can generate a user measurement profile 512 representing a set of measurements for predetermined portions or aspects of the user and seating components that help the user assume and maintain an optimal position and functionality.

In some embodiments, the design mechanism 504 (e.g., a computing device running a software application) can calculate dimensions of frame components 516 (e.g., structures that are assembled together) used to build the variable tilt wheelchair 100. For example, the design mechanism 504 can use a method, an equation, a routine, an algorithm or a combination thereof to generate a segment length profile 514 (e.g., a set of lengths and/or widths and/or any angles corresponding to components that form the frame and/or the tilt assembly 150 of FIG. 1, such as for the rear-vertical portion 112 of FIG. 1, the bottom-horizontal portion 114 of FIG. 1, the front vertical portion 120 of FIG. 1, the floating link 162 of FIG. 1, the grounded links, etc.) based on the user measurement profile 512. The design mechanism 504 can similarly generate the locking positions 306 based on the user measurement profile 512.

In some embodiments, the assembly device 506 can include a robotic assembly system that configures or manipulates the frame components 516 and locate and maintain them during their assembly to form the variable tilt wheelchair 100. For example, the assembly device 506 can configure frame components 516 (e.g., by locating features such as bends, holes, and welds), arrange the frame components 516 (e.g., by physically positioning the components, such as using robots or movable fixtures), attaching the components (e.g., by welding the components together or inserting pins or other attachment mechanisms), or a combination thereof according to the segment length profile 514, the locking positions 306, or a combination thereof. The assembly device 506 can automatically execute (e.g., with or without direct human interaction to perform the corresponding steps, such as according to software instructions) one or more steps for forming the variable tilt wheelchair 100.

Figure 6:
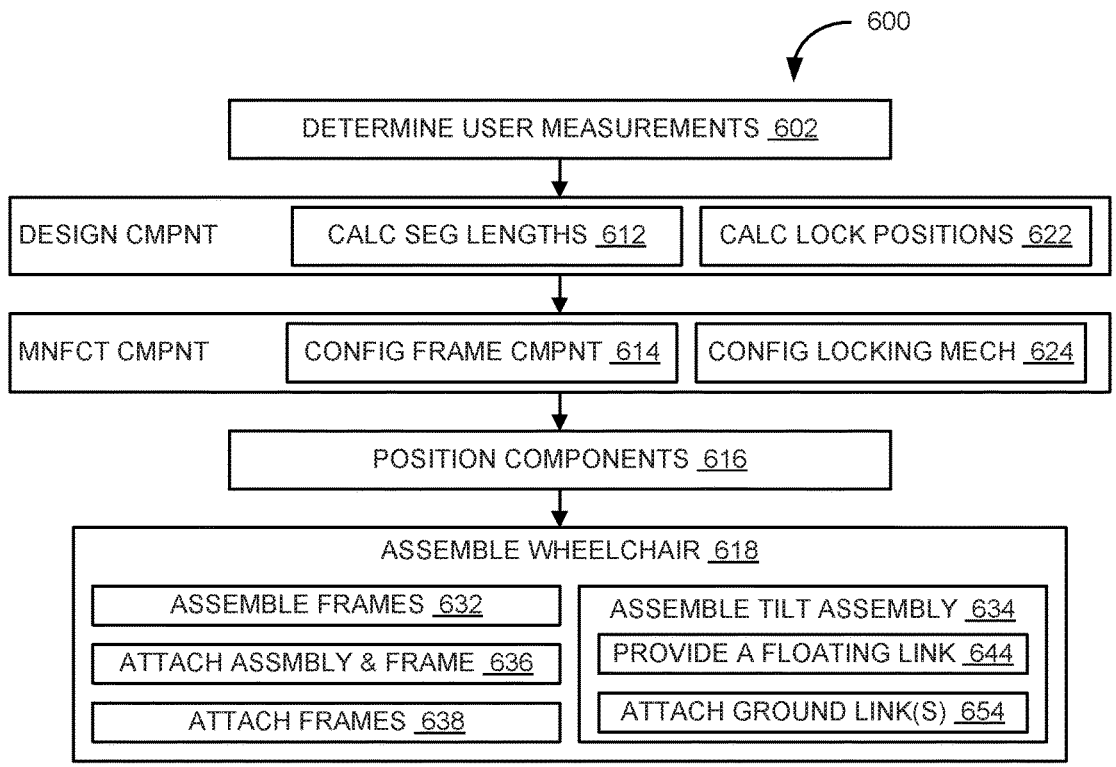
FIG. 6 is an example method of manufacturing the variable tilt wheelchair in accordance with an embodiment of the present technology.

FIG. 6 is an example method 600 of manufacturing the variable tilt wheelchair 100 of FIG. 1 in accordance with an embodiment of the present technology. In some embodiments, the method 600 can be implemented using the system 500 of FIG. 5.

At a block 602, the system 500 can determine user measurements and determine the user measurement profile 512 of FIG. 5. For example, the measurement device 502 of FIG. 5 can simulate seating system components and positional supports to be tested with a specific user in order to determine the optimal configuration for that user, and then feed this information into a user measurement profile 512 representing the unique user.

In some embodiments, the system 500 (e.g., using the design mechanism 504 of FIG. 5) can design physical aspects (e.g., physical shape and/or dimensions) of the frame components 516 of FIG. 5, the relative positioning mechanism 160 of FIG. 1, the locking mechanism 180 of FIG. 1, an arrangement or a position thereof, a portion or a segment thereof, or a combination thereof. For example, at a block 612, the system 500 can calculate segment lengths and arrangement angles or positions for the frame components 516. The design mechanism 504 can use the user measurement profile 512 as an input parameter to calculate the segment length profile 514 (e.g., including lengths, positions or angles, or a combination thereof for the set of frame components 516). Also for example, at a block 622, the system 500 can similarly calculate the locking positions 306 of FIG. 3 for the locking mechanism 180 of FIG. 1. The design mechanism 504 can use the user measurement profile 512 as an input parameter to calculate locations for the locking holes 304 of FIG. 3 on the locking plate 302 of FIG. 2.

In some embodiments, the system 500 (e.g., using the assembly device 506 of FIG. 5) can configure fixtures to aid in the manufacture of parts used to make or assemble the variable tilt wheelchair 100 (e.g., the frame components 516, the relative positioning mechanism 160, the locking mechanism 180, a portion or a segment thereof, or a combination thereof). For example, at a block 614, the assembly device 506 can physically configure the frame components 516, the grounded links, the floating link 162, or a combination thereof such as by cutting or bending metal tubes or bars according to the segment length profile 514. Also for example, at a block 624, the assembly device 506 can similarly configure the locking plate 302 according to the locking positions 306, such as by shaping the locking plate 302, creating the locking holes 304 according to the locking positions 306, or a combination thereof.

In some embodiments, the system 500 (e.g., using the assembly device 506) can arrange or position parts used to make or assemble the variable tilt wheelchair 100. For example, at a block 616, the assembly device 506 can physically position one or more of the parts (the frame components 516, the relative positioning mechanism 160, the locking mechanism 180, a portion or a segment thereof, or a combination thereof) or holders for the corresponding parts according to the calculated results for assembly.

In some embodiments, the system 500 (e.g., using the assembly device 506) can finalize the assembly of the variable tilt wheelchair 100, such as by connecting the assembled parts (e.g., by welding or by attaching any pins, connectors, or fasteners). In some embodiments, the side frames (e.g., the first frame 102 of FIG. 1 and the second frame 104 of FIG. 1) can be assembled separate from the tilt assembly 150. For example, at a block 632, the first frame 102 and the second frame 104 can each be assembled. At a block 634, the tilt assembly 150 can be assembled, such as by providing the floating link 162 (e.g., as illustrated in a block 644) and the attaching the grounded link(s) (e.g., the first grounded link 164 of FIG. 1, the second grounded link 166 of FIG. 1, the first pair of members 402 of FIG. 4, the second pair of members 404 of FIG. 4, etc.) to the floating link 162 168 (e.g., as illustrated in a block 654) for the first pin joint 172 of FIG. 1. At a block 636, the tilt assembly 150 can be attached to the corresponding frame (e.g., by attaching the grounded link(s) to the front vertical portion 120 for the second pin joint 174 of FIG. 1). At a block 638, the frames can be connected to each other (e.g., by directly connecting to opposing ends of the brace structure 110 of FIG. 1).

In some embodiments, the assembly of the tilt assembly, the assembly of the frames, and attachment of the two can be combined into one process (e.g., combining the blocks 632-636). For example, the proximal portion of the grounded link(s) and the locking mechanism 180 can be attached to or formed on the frame components 516 during or as part of assembling the frame components 516.

In some embodiments, one or more of the steps discussed above can be performed by an outside operator (e.g., a human assembler). For example, a human operator can measure various physiological aspects of the user, and enter the measurements into the design mechanism 504. Also for example, according to the resulting segment length profile 514 and/or the locking positions, the human operator can form, arrange, assemble, and/or connect the frame components 516, the relative positioning mechanism 160, the locking mechanism 180, or a combination thereof.

The configuration of joints and links (e.g., individual lengths and/or width of the first grounded link 164, the second grounded link 166, and/or the floating link 162, locations of first pin joint 172, the second pin joint 174, or a combination thereof) of the four bar mechanism can be designed for each wheelchair and user. Further, the configuration of joints and links can be designed to align the caster stem housing 154 and/or the stem of the front caster wheel 152 perpendicular to the ground for multiple positions and tilt angles, which allows the wheelchair to track straight. Also, the configuration of joints and links can be designed so that the movement of the grounded links would have a center-of-rotation coincidental to the wheel axle 108 for the upper and lower tilted positions.

Accordingly, the grounded links and the rotating joints provide user comfort and increased usability by allowing the user to maintain a fixed position with respect to the drive wheel 106 and the wheel axle 108 as the degree of tilt is changed. Thus, wheel access and user hand-to-wheel distance are maintained for the different degrees of tilt.

The relative positioning mechanism 160 that is configured to change a vertical distance between the connected front caster wheel 152 and the frame provides a cheaper way to build the variable tilt wheelchair 100 that is customized to individual users. The relative positioning mechanism 160 allows the use of existing chair designs (e.g., for the frames).

Further, the tilt assembly 150 (e.g., including the relative positioning mechanism 160 and the locking mechanism 180) allows the variable tilt wheelchair 100 to be foldable and have less weight, thereby providing increased usability. The tilt assembly 150 can eliminate the use of two frames that are separated along a vertical direction (e.g., a base frame for the wheels and a top frame for the seat and the backrest). The elimination of a separate frame set can reduce the number of necessary parts, thereby reducing the weight, cost and assembly time. Further, the tilt assembly 150 attached at a lower front portion of the frames can allow for use of existing folding chair designs.

Figure 7:
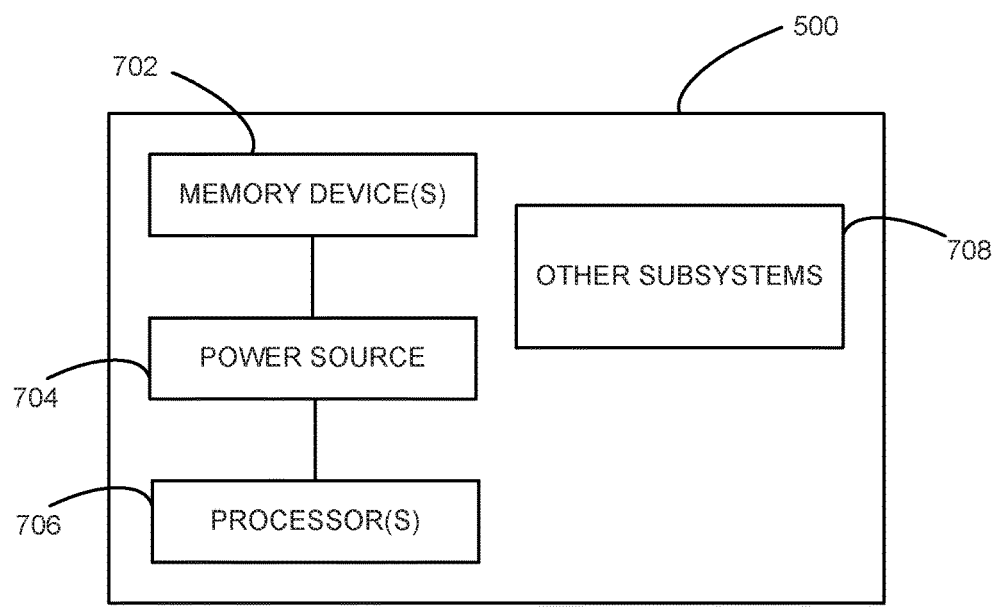
FIG. 7 is a schematic view of the system for manufacturing the variable tilt wheelchair in accordance with an embodiment of the present technology.

FIG. 7 is a schematic view of the system 500 for manufacturing the variable tilt wheelchair 100 of FIG. 1 in accordance with an embodiment of the present technology. Any one of the components described above with reference to FIGS. 1-6 can be incorporated into or manufactured by the system 500 shown schematically in FIG. 7. The system 500 can include one or more memory devices 702, a power source 704, one or more processors 706, and/or other subsystems or components 708 (e.g., sensors, actuators, stepper motors, the measurement device 502 of FIG. 5, the assembly device 506 of FIG. 5, etc.). The memory device 702 can include non-transitory storage devices, such as volatile memory (e.g., random access memory (RAM)) or non-volatile memory (e.g., Flash memory or magnetic discs). The one or more processors 706 can include general-purpose or special-purpose microprocessors, programmable controllers, application-specific integrated circuits (ASICs), programming logic devices (PLDs), or the like, or a combination of such devices. The one or more processors 706 can execute computer-executable instructions stored in the one or more memory devices 702, such as for implementing the design mechanism 504 of FIG. 5, the method 600 of FIG. 6, or a combination thereof.

Components of the system 500 may be housed in a single unit or distributed over multiple, interconnected units (e.g., through a communications network). The components of the system 500 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

In the above descriptions, numerous specific details are given to provide a thorough understanding of the invention. However, it will be apparent that the invention may be practiced without these specific details. In order to avoid obscuring an embodiment of the present invention, some well-known circuits or components, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

I claim:

1. A wheelchair, comprising:
   a frame including a backrest portion; and
   a drive wheel attached to the frame using an axle, wherein the axle is attached below the backrest portion and is configured to have the wheel rotate about the axle;
   a front wheel connected to the frame and horizontally offset from the drive wheel; and
   a relative positioning mechanism connected to the frame and the front wheel, wherein the relative positioning mechanism includes two or more settings that locate the front wheel at two or more positions relative to the frame along a vertical direction.

2. The wheelchair of claim 1, wherein:
   the frame includes a front portion and a bottom portion; and
   the relative positioning mechanism is attached to the front portion, the bottom portion, or a combination thereof of the frame.

3. The wheelchair of claim 1, wherein the relative positioning mechanism includes:
   a floating link attached to the front wheel;
   a grounded link including a first end portion and a second end portion, wherein:
      the first end portion is attached to the frame and forms a rotating joint with the frame, and
      the second end portion is attached to the floating link.

4. The wheelchair of claim 3, further comprising a locking mechanism, operatively coupled to the relative positioning mechanism, configured to secure the caster stem housing at two or more positions relative to the frame, wherein the locking mechanism includes:
   a positioning plate between the floating link and the frame, wherein the positioning plate includes at least two locking holes; and
   a locking pin configured to insert into one of the at least two locking holes and affix the floating link at a location relative to the frame.

5. The wheelchair of claim 4, wherein:
   the positioning plate is attached to the frame; and
   the locking pin is integral with the grounded link, wherein the locking pin extends perpendicular to a direction between the first end portion and the second end portion.

6. The wheelchair of claim 5, wherein the positioning plate forms a hinged joint with the frame, wherein the positioning plate is configured to rotate about the frame for engaging and disengaging the locking pin.

7. The wheelchair of claim 1, further comprising:
   a first grounded link including a first pair of linking members attached to opposing surfaces of the floating link and opposing surfaces of the frame; and
   a second grounded link including a second pair of linking members attached to opposing surfaces of the floating link and opposing surfaces of the frame at locations different than the first link pair.

8. The wheelchair of claim 1 wherein the relative positioning mechanism is attached at a portion of the frame located in front and below the rear drive wheel axle.

9. The wheelchair of claim 1, wherein the two or more settings of the relative positioning mechanism rotate the entire frame about the drive wheel axle for positioning the backrest at the two or more angles relative to the horizontal plane.

10. The wheelchair of claim 1, further comprising:
    a seat attached to the frame and extending across along a horizontal direction;
    a further frame attached to the seat opposite the frame; and
    a matching relative positioning mechanism attached to the further frame, wherein the matching relative positioning mechanism complements the relative positioning mechanism for positioning the backrest at the two or more angles relative to the vertical direction.

11. The wheelchair of claim 10, further comprising a brace attached to the frame and the further frame, wherein the brace is configured to adjust a length between the frame and the further frame for providing a folding mechanism.

12. The wheelchair of claim 11, wherein the brace is a foldable cross brace.

13. A method of manufacturing a wheelchair, the method comprising:
    determining a user measurement profile representing physiological measurements of a user;
    calculating locking positions for a tilt assembly based on the user measurement profile, wherein the locking positions correspond to changing positions of a backrest of the wheelchair relative to a vertical direction;
    forming a frame for the wheelchair according to the user measurement profile; and
    forming the tilt assembly operably coupled to the frame, wherein:
       the tilt assembly is formed according to the locking positions and the user measurement profile, and
       the tilt assembly is configured to change a position of a caster wheel along a vertical direction relative to the frame.

14. The method of claim 13, wherein calculating the locking positions includes calculating the locking positions using one or more processors.

15. The method of claim 13, wherein forming the frame includes operating an assembly device using one or more processors to position frame components.

16. The method of claim 13, wherein forming the tilt assembly includes:
    providing a floating link including the front caster assembly;
    attaching a grounded link to the floating link, wherein a first end portion of the grounded link is attached to the floating link with a pin to form a pin joint with the floating link; and
    attaching the grounded link to the frame, wherein a second end portion of the grounded link is attached to the frame with a further pin to form a further pin joint with the frame.

17. The method of claim 13, wherein: calculating the locking positions includes calculating locations of holes on a locking plate, wherein the holes are configured to complement a locking pin for fixing the floating link relative to the frame.

18. A system for manufacturing a wheelchair, the system comprising:
    a seating system interface configured to receive a user measurement profile representing physiological measurements of a user;
    one or more processors, operably coupled to the interface, configured to calculate locking positions for a tilt assembly based on the user measurement profile, wherein the locking positions correspond to changing positions of a backrest of the wheelchair relative to a vertical direction based on changing a position of a front wheel of the wheelchair along a vertical direction relative to a frame; and
    an output mechanism, operably coupled to the one or more processors, configured to communicate the locking positions for manufacturing the wheelchair.

19. The system of claim 18, further comprising a measurement device, operably coupled to the interface, configured to generate the user measurement profile based on automatically measuring the physiological aspects of the user.

20. The system of claim 18, wherein:
    the one or more processors are configured to calculate a segment length profile based on the user measurement profile, wherein the segment length profile represents dimensions for the wheelchair; and
further comprising:
    an assembly device, operably coupled to the output mechanism, configured to automatically position frame components according to the segment length profile for assembling the frame components to manufacture the wheelchair.

* * * * *